(12) United States Patent
Nielsen

(10) Patent No.: US 6,337,699 B1
(45) Date of Patent: Jan. 8, 2002

(54) VISUALIZING DEGREES OF INFORMATION OBJECT ATTRIBUTES

(75) Inventor: Jakob Nielsen, Atherton, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 781 days.

(21) Appl. No.: 08/673,184

(22) Filed: Jun. 27, 1996

(51) Int. Cl.[7] .................................................. G06F 3/14
(52) U.S. Cl. ........................................ 345/837; 345/772
(58) Field of Search ................................. 395/348, 349, 395/326, 333, 334, 335, 339; 345/348, 349, 326, 333, 334, 335, 339, 835, 837, 838, 839, 764, 765, 772, 775, 776, 777, 866

(56) References Cited

U.S. PATENT DOCUMENTS

| | | | | |
|---|---|---|---|---|
| 5,065,347 A | * | 11/1991 | Pajak et al. ................. | 345/835 |
| 5,257,349 A | * | 10/1993 | Alexander ..................... | 709/1 |
| 5,305,435 A | * | 4/1994 | Bronson ........................ | 345/777 |
| 5,333,256 A | * | 7/1994 | Green et al. ................. | 345/772 |
| 5,365,360 A | * | 11/1994 | Torres ......................... | 345/802 |
| 5,420,968 A | * | 5/1995 | Johri ........................... | 345/619 |
| 5,428,736 A | * | 6/1995 | Kahl et al. .................. | 345/839 |
| 5,644,334 A | * | 7/1997 | Jones et al. ................. | 345/419 |
| 5,680,558 A | * | 10/1997 | Hatanaka et al. ........... | 345/838 |
| 5,706,454 A | * | 1/1998 | MacPhail ..................... | 345/822 |

OTHER PUBLICATIONS

"Microsoft Mail User's Guide", version 3.0, Microsoft Corporation, pp. 1–2, 1992.*

* cited by examiner

Primary Examiner—Crescelle N. dela Torre
(74) Attorney, Agent, or Firm—McDermott, Will & Emery

(57) ABSTRACT

Display of an icon is modified to permit information about at least four independent multiple valued variables to be readily received by a viewer. Frequency of blinking, degree of blinking, color and degree of fill of interior space of an icon are used to represent variable information. Classification of e-mail by "importance" of originator, by priority and by due date is reflected in the icon display is illustrated in one example. In another, the percent of files changing since the last access is displayed using a folder icon.

18 Claims, 16 Drawing Sheets

| CONTROL BIT SETTING | FREQUENCY | SAMPLE SEMANTICS |
|---|---|---|
| 11 | 2.0 Hz | URGENT IMPORTANT CUSTOMER |
| 10 | 1.0 Hz | URGENT INTERMEDIATE CUSTOMER |
| 01 | 0.5 Hz | URGENT SMALL CUSTOMER |
| 00 | 0.0 Hz | NOT URGENT |

FIG. 4

| DIGITAL COLOR REPRESENTATION | COLOR | R | G | B |
|---|---|---|---|---|
| 1111 0000 0000 | INTENSE RED | 100% | 0 | 0 |
| 0010 0000 0000 | LOW INTENSITY RED | 10% | 0 | 0 |
| 0000 1111 0000 | GREEN | 0 | 100% | 0 |
| 0000 0000 1111 | BLUE | 0 | 0 | 100% |

FIG. 7

| DIGITAL STATE | COLOR | R | G | B |
|---|---|---|---|---|
| BACKGROUND | PURPLE | 5% | 60% | 60% |
| FILL | RED | 90% | 5% | 5% |
| INTERMEDIATE FILL | | 47.5% | 32.5% | 32.5% |

FIG. 8

| TERM(S) FROM INFORMATION OBJECT | DESIRED COLOR | BLINK ATTRIBUTE |
|---|---|---|
| JACK A. JONES | RED | AGGRESSIVE BLINK 11 |
| PROJECT SETI | BLUE | 00 |
| ORDER FORM | YELLOW | 11 |

FIG. 12

NAME OF ICON:          TYPE:

INFORMATION OBJECT REQUESTED:

OUTLINE:     POINTER TO STORAGE

DEGREE OF FILL:

COLOR OF FILL:

FREQUENCY OF BLINKING:

DEGREE OF BLINKING:

LOCATION ON SCREEN:

PROCESS 1:    PAINT PIXELS OF ICON

FIG. 13

VISUALIZING DEGREES OF INFORMATION OBJECT ATTRIBUTES

BACKGROUND OF THE INVENTION

1. Field of the Invention

The invention relates to computer systems, and more particularly to extending the information displayed by icons in a graphical user interface.

2. Description of Related Art

As the storage capacity of individual memory chips increases and the storage capacity of disk drives increases the number of objects which can be stored and made available to a user explodes. As a result, users often have the need to scan large sets of information objects. Examples include the lists of book marks maintained by web browsers, the results set in information retrieval systems, the inbox of e-mail messages and discussion group threads. If each member of these classes of objects is represented by an icon, then the user is confronted with an array of identical objects with no way of distinguishing information which is important from that which is not.

Several applications (e.g. a Mailtool from Sun Micro Systems) visualize the fact that an e-mail inbox has changed by giving it a different icon (e.g., a plain mailbox versus a stack of mail with an envelope sticking up or a road side mailbox with the flag up or down).

The MacIntosh® finder allows the user to assign a color to a desktop icon to indicate that it has a different status. For example, an icon for a "hot" project can be made red by the user.

Several applications use blinking to attract users attention to particularly important content. For example, the Netscape Navigator™ blinks text that has been marked by the page author as being important.

The Problems:

When viewing a display screen having a large number of icons thereon, it is difficult to determine which of the icons one should direct his attentions. If all icons look the same, then a user may neglect icons with important information in favor of those which have no new information or less important information.

In all of the cases mentioned, the prior art uses a dichotomy to visualize two levels of attributes encoded by the changed icon, colorized icon, or blinking information. Also, the prior art uses a single encoding scheme and thus can only encode a single information attribute.

Object oriented programming is a known form of software development that models the real world with representation of objects or modules that contain data as well as instructions that work upon that data. Objects are the basic building blocks of a program. Objects are software entities. They may model something physical like a person or they may model something virtual like checking account. Normally an object has one or more attributes (fields) that collectively define the state of the object; behavior defined by a set of methods (procedures) that can modify those attributes; and an identity that distinguishes it from other objects. Encapsulation refers to the hiding of the details of the object. This permits an object to be treated in a single entity. However, the set of operations associated with the object are explicit and constitute a well defined interface. One object requests another object to perform one or more operations through messaging. An object is sometimes referred to as an instance of an abstract data type or class. The programmer may define a class of objects by describing the attributes and procedures common to the class. By defining the class only once, a plurality of instances can be created by associating the class attributes and procedures with each instance and allowing the instances to differ only in their identity or in a particular value associated with the range of values permitted for the class.

Object oriented programming also permits creation of subclasses in which class attributes and procedures can be inherited by subordinate subclasses and creation of super classes in which only the common attributes and procedures of a group of instances of various classes are retained as the defining characteristics.

SUMMARY OF THE INVENTION

The present invention permits the visual presentation of an icon to be expanded to include information about four different attributes of the underlying object represented by the icon, each attribute being represented by a plurality of states in excess of two. Four independent variables can be utilized to control, respectively, the degree of fill of the icon, the color of fill of the icon, the degree of blinking of the icon, and frequency of blinking of the icon.

The invention also permits values for the independent variables to be determined automatically from the underlying object at the time an object is created or revised.

In this way a user can visualize and distinguish icons based on their content and can classify them as to importance.

The invention relates to apparatus for displaying information, including a computer, a display controller configured to control the display of icons so that more than one independent variable may represented simultaneously in the visual display of an icon, and a display connected to the computer by the display controller. Four independent variables can be represented. Their representations include frequency of blinking, degree of blinking, degree of fill and color of icon, respectively. Degree of blinking includes a no blink state, a subtle blink state, an intermediate blink state and an aggressive blink state.

The invention also relates to a method for displaying information, by independently setting two or more visual characteristics of an icon to represent information about the information object represented by the icon, the visual characteristics being selected from the group comprising frequency of blinking, degree of blinking, degree of fill and color of icon. In one form, the information object is a file folder and the information includes a percentage of files having a revision date subsequent to the last time the user viewed the file. This can be represented by degree of fill. In another form, the information object is an e-mail message and the information includes information about the originator of the message and/or about the content of the message. Information about the content can be due date or priority.

The invention also relates to a method for displaying information, by scanning the text of an e-mail message for key words or phrases, and setting a visual characteristics of an icon based on the key words or phrases.

The invention also relates to a method of displaying information, by determining information attributes for an information object, representing the attributes as icon control parameters, storing the parameters as an instance of an icon object representing the class of objects to which the information object belongs, and controlling the display of an icon representing the information object using stored icon control parameters.

The invention is also directed to a computer system, including a network, and a plurality of computers connected to the network, at least one of the computers configured to control the display of icons so that more than one independent variable may represented simultaneously in the visual display of an icon.

The invention also relates to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects come with features and advantages of the system of the present invention will be apparent from the following description in which:

FIG. 4 illustrates the relationship between control bits, frequency of blink and exemplary semantics.

FIG. 7 is a simplified look up table linking digital color representation with color and red, green and blue electron gun intensities.

FIG. 8 is a table illustrating a deterministic calculation of an intermediate fill color value.

FIG. 12 is an exemplary database linking terms of an information object with desired color and degree of blinking useful in the process of FIG. 11.

FIG. 13 illustrates how an icon object is represented in an exemplary form of the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
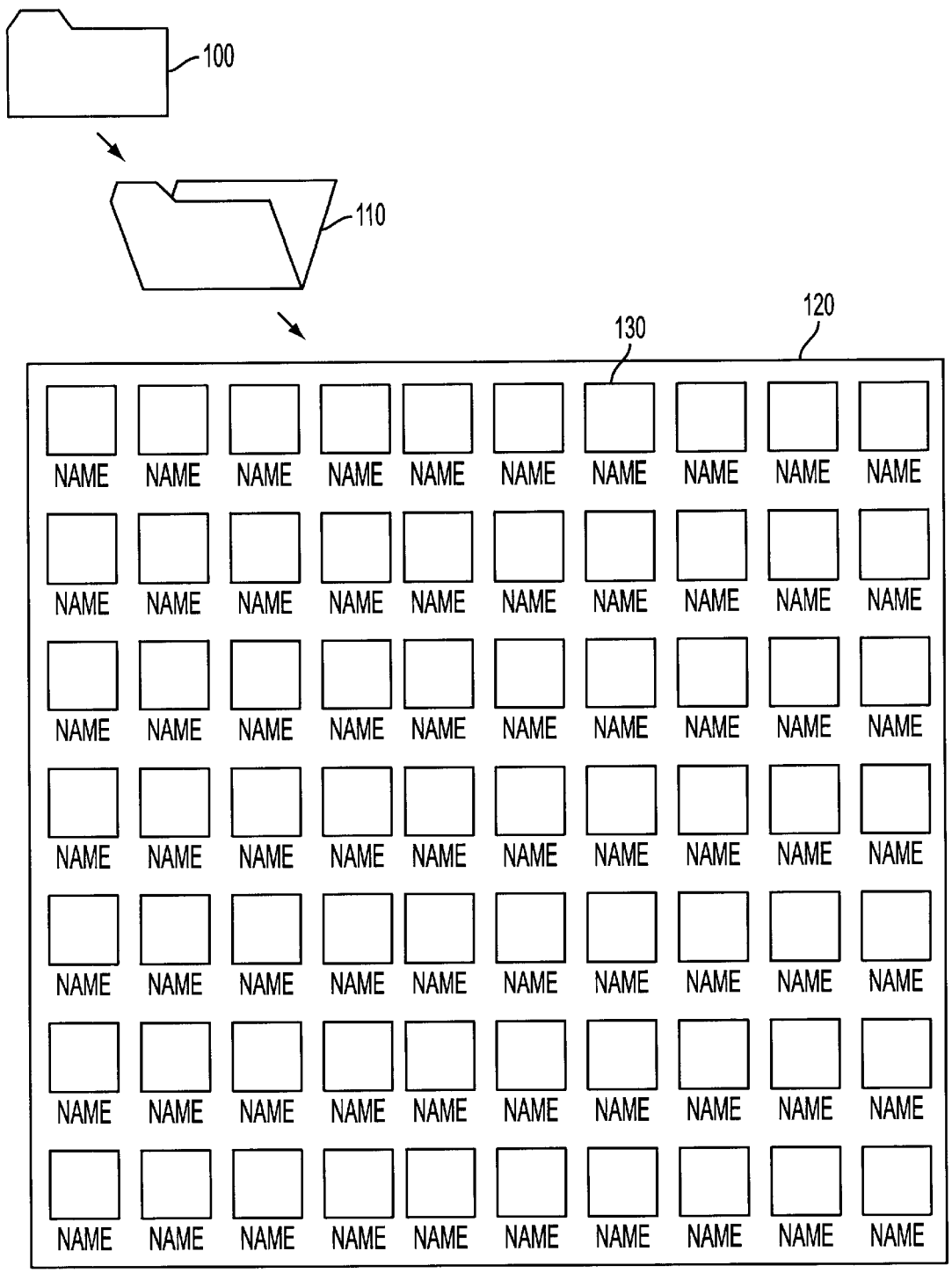
FIG. 1 illustrates opening of a folder icon containing a large number of information objects.

FIG. 1 illustrates opening of a folder icon containing a large number of information objects. As shown in FIG. 1, when one double clicks on a closed icon 100 to open it (indicated by the open file icon 110, a plurality of information objects are displayed on the screen (120)). In the example given, each one of a plurality of icons 130 represents an underlying information object, which, in example given, is a file.

Figure 2:
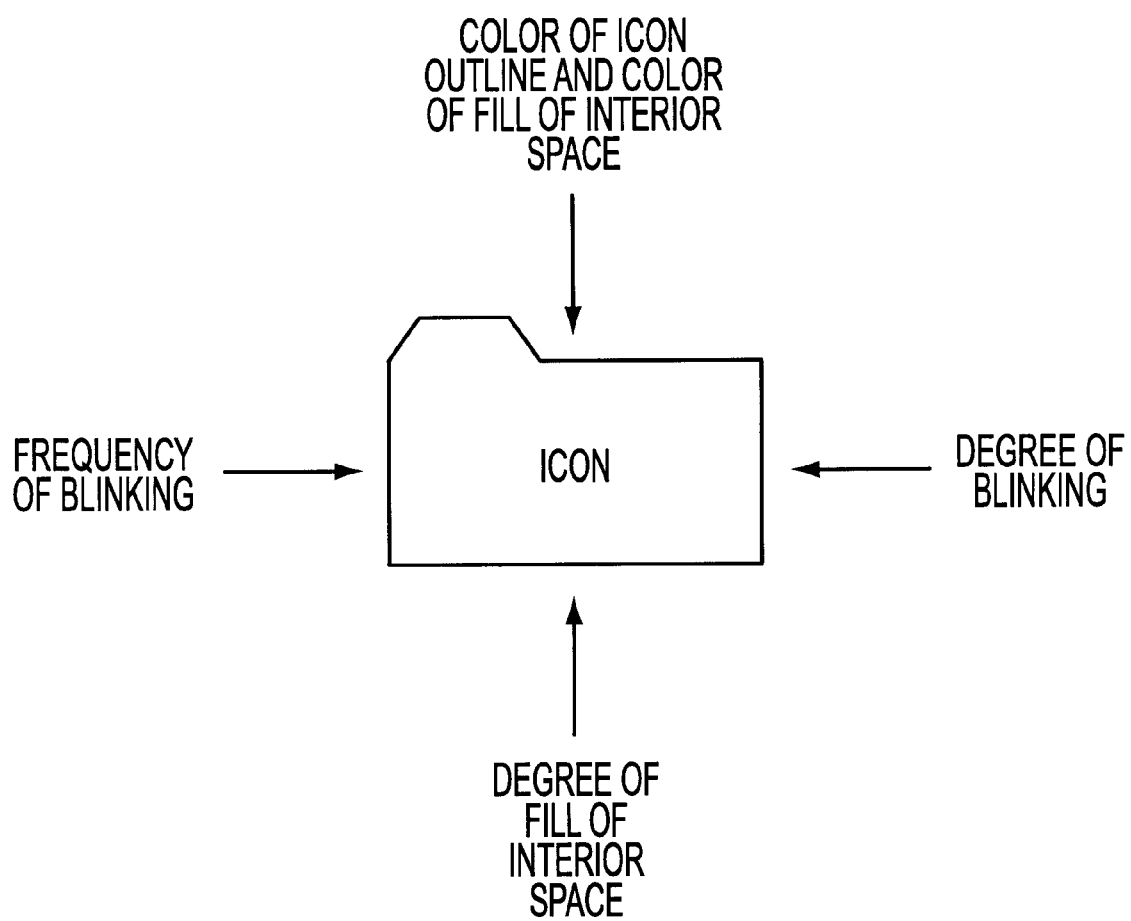
FIG. 2 illustrates icon attributes which are independently set to modify the visual appearance of the icons.

FIG. 2 illustrates icon attributes which are independently set to modify the visual appearance of the icons. These represent essentially four degrees of freedom in setting the attributes of the icon to reflect information about the underlying information object. The four degrees of freedom are:

1. Degree of blinking
2. Frequency of blinking
3. Color of icon outline and color of fill of interior space
4. Degree of fill of interior space.

Figure 3A:
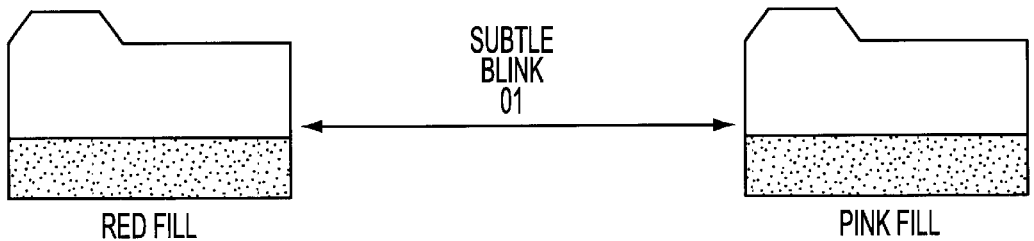
FIGS. 3A, 3B, 3C and 3D represent degree of blinking namely subtle blink, intermediate blink, aggressive blink and no blink, respectively.

FIGS. 3A, 3B, 3C and 3D represent the degree of blinking associated with an icon. FIG. 3A represents a subtle blinking situation, established by bit pattern "01", in which the red fill of the normal icon is alternated with a pink fill. The color of the intermediate fill, in this case, pink, is chosen to lie somewhere intermediate between the red fill and the background color. This is discussed more hereinafter.

Figure 3B:
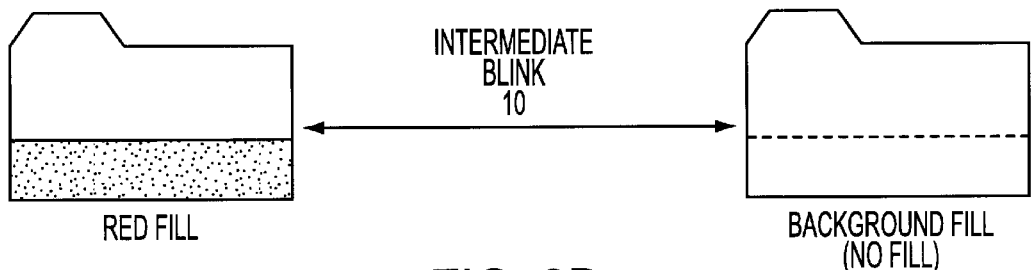

FIG. 3B illustrates an intermediate blink situation in which the normal red fill of the icon is alternated with a background fill (essentially no fill) which provides an even stronger indication of blink than that shown in FIG. 3A.

Figure 3C:
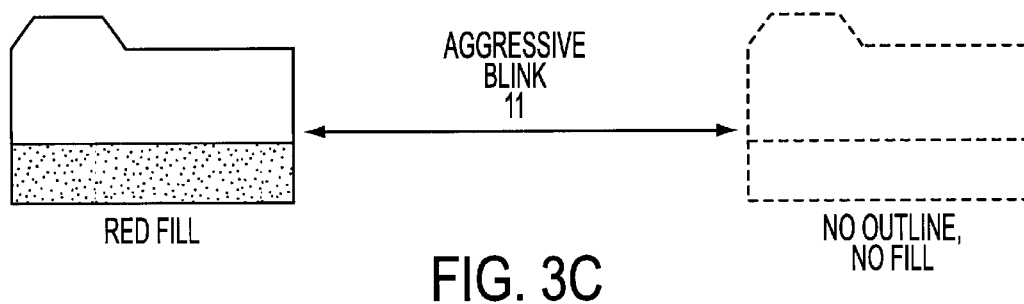

FIG. 3C shows an aggressive blink situation in which entire icon alternates between the presentation shown on the left and nothing, that is, the entire icon alternates between visibility and invisibility.

Figure 3D:
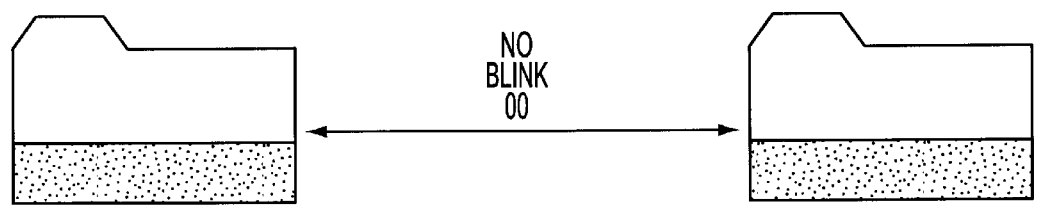

FIG. 3D illustrates a no blink situation in which the icon remains unchanged and does not visually alternate in a blinking pattern.

FIG. 4 illustrates relationships between control bits, frequency of blinking and exemplary semantics. The frequency with which blinking of the various sorts discussed in conjunction with FIGS. 3A through 3D occurs, is controlled by a two bit control bit setting. In the context of, for example, an e-mail environment, one may wish to categorize incoming e-mail messages in accordance with the degree of urgency and/or in accordance of the importance of the originator of the message. As shown in FIG. 4, when an urgent message from an important customer arrives, the blinking would occur at a fast rate, in this case at 2 hertz. This is established by a control bit setting of "11". These control bits will be discussed more hereinafter. If an urgent message is received from an intermediate customer, the frequency of blinking might at only 1 hertz or if, from a small customer, the blinking might be at half a hertz. If the message is not urgent whatsoever then no blinking would occur.

Figure 5:
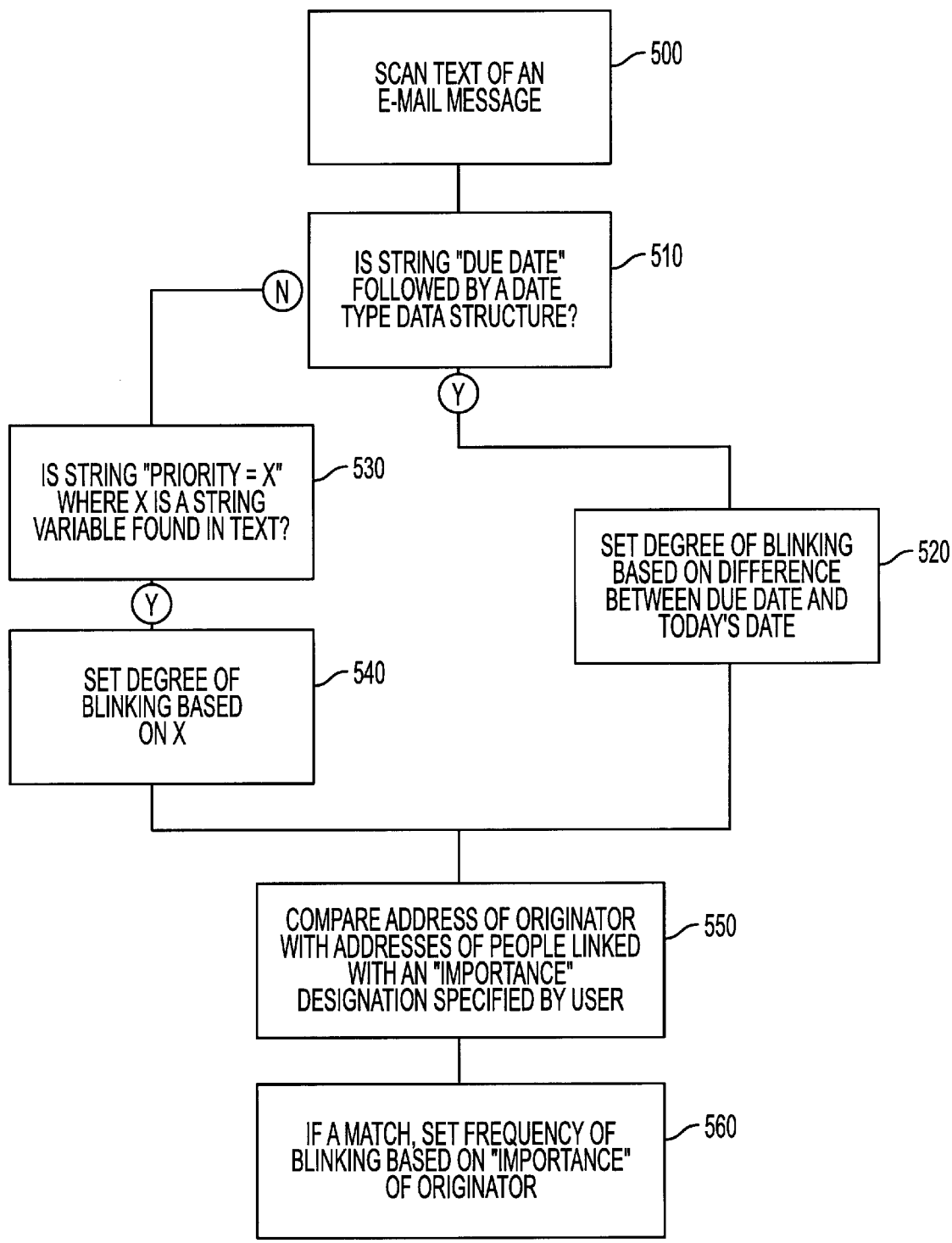
FIG. 5 is a flow chart of a process for using degree of blink and frequency of blink.

FIG. 5 is a flow chart of a process for using degree of blink and frequency of blink. This example utilizes an e-mail message as a demonstration. When an e-mail message is received and stored, it will be associated with an icon. Upon receipt, the text of the e-mail message will be reviewed (500) and a determination made whether or not the string "due date" is followed by a date type of data structure. A number of representations of date are in common usage and each would constitute an acceptable date type data structure (510). If there is a due date specified, degree of blinking will be set based on the difference between the due date and today's date (520). If there is no "due date", a check will be made to determine if the string "priority equals X" exist in the text. X is a stringed variable in which could assume exemplary values such as "high", "low" or some other indication of relative priority. The syntax for expression of priority can be standardized to facilitate the use of icon control in accordance with the invention. The degree of blinking will be set based on the string variable X which is an indicator of the degree of priority (540). Once a degree of blinking has been set (520 or 540), the address of the originator is compared with the addresses of people linked within an "importance" designation specified by the user (550) as discussed more hereinafter in conjunction with FIG. 12. The frequency of blinking is then set based the "importance" of the originator (560).

Figure 6:
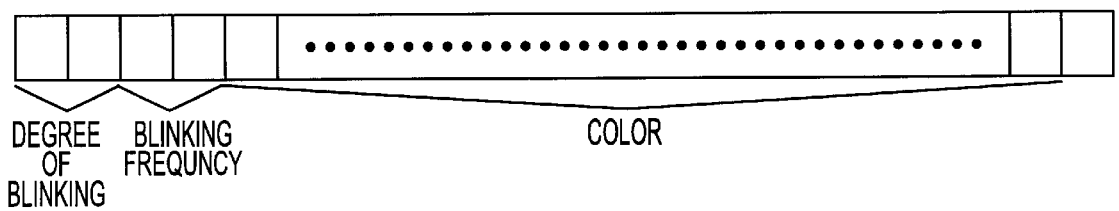
FIG. 6 is an exemplary representation of a color pixel.

FIG. 6 is an exemplary representation of a color pixel. In the example shown in FIG. 6, two bits are reserved for specifying the degree of blinking. Another two bits are set aside for specifying blinking frequency. A plurality of bits are utilized to represent color and intensity. The way in which the color field shown in FIG. 6 is utilized depends upon the particular color representation scheme utilized with a particular display and display control system.

FIG. 7 is a simplified look up table linking digital color representation with color and red, green and blue electron gun intensities. A number of color representation schemes are in use. In one, color is specified as relative intensities of red, green and blue light. This type of display is often utilized in display devices having triads of primary color phosphor dots which are selectively activated by separate electron guns for each of the dots of the triad. This type of representation scheme will be assumed for the discussion of this figure.

Another system utilizes intensity, hue and saturation values as a medium for expressing color. In fact, color perceived by human is not only a function of the sensitivity of the color sensors in the eye but is a function of the emissions spectra of the phosphors utilized to generate color as well the relative intensity of light emitted as a function of electron beam bombardment.

Typically, the complex interactions involved in the generation of color are captured in a look up table in which a particular digital color representation representing a particular color is mapped to, in the case of an RGB expression of color, relative intensities of red, green and blue electron beams. In the simplified example shown in FIG. 7, a 12 bit digital word is utilized, with respective 4 bit subsets of the word corresponding to relative intensities of red, green and blue. In a representation of intense red, the digital value associated with a red electron gun could be "111" and the digital value associated with the other electron guns would be "0000". In the example shown, the red electron gun would be modulated at 100% of intensity whereas the green and blue guns would be turned off. If a low intensity red were desired, then the first four bits would be represented as "0010" which would be a fraction of the output of the that shown in the first entry. In the third entry, an intense green is desired and in the last entry, an intense blue is desired.

FIG. 8 is a table illustrating a deterministic calculation of an intermediate fill color value. In the example shown, the background color for the display is set to a purple having a mix of colors of 5% red, 60% green and 60% blue. The fill color is red having a 90% red, 5% green and 5% blue mix. In the example shown, an intermediate fill value is determined which may or may not be nicely describable with an adjective for the resulting color, using a value for each color component which is halfway between the value for the background component and the fill component. As an example, the difference between the red component for the fill in the background is 85%. Half of that is 42.5% which, is added to the base line 5% of the background represents 47.5% value shown in the intermediate fill row. Similar calculations apply to green and blue with result that the intermediate fill color is specified by intensities halfway between the background and fill colors. Since this type of arithmetic or deterministic calculation may result in a color subjectively unpleasant to some, a user may manually specify an intermediate fill value as default along with default background and fill colors.

Figure 9:
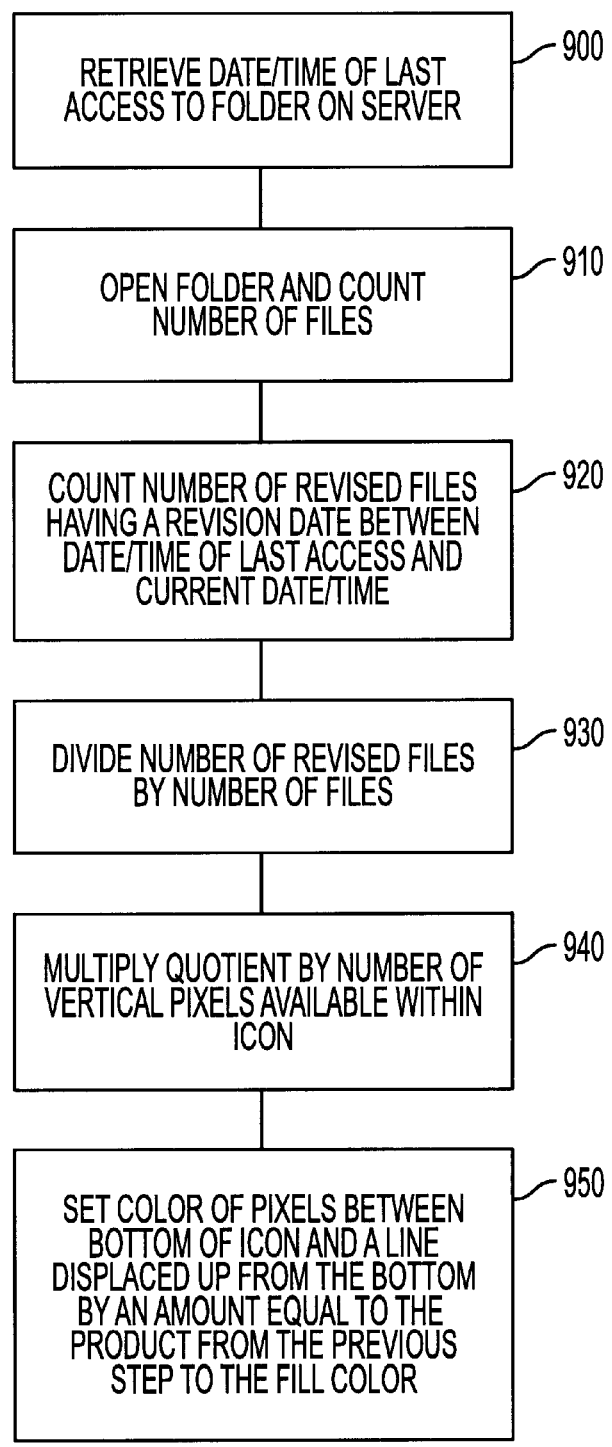
FIG. 9 is a flow chart of an exemplary process for calculating degree of fill.

FIG. 9 is a flow chart of an exemplary process for calculating degree of fill. In this example, the icon being considered is an icon representing a folder or a directory such as might on a server. This might, for example, be a folder containing files shared by a group in a group of applications. The user's computer either stores or retrieves the date and time of the last access to the folder on the server (900). The folder is opened and the number of files counted (910) and at the same time, a number of files having a revision date between the date time of the last access and the current date time is determined (920). The number of revised files is divided by the total number of files (930) and that quotient is multiplied by the number of vertical pixels available within the icon (940). For example, if ten vertical pixels were available within the icon, and the fraction of revised files to total number of files was 0.20, then the bottom two pixels of the space between the bottom of the icon and two pixels up from the bottom the icon would be set to the field color.

Note that one could easily fill an icon from left to right or from right to left as well as from bottom to top, however, the analog to a container being "filled" is strong and a bottom up fill is preferred.

The date and time of last access to a folder on a server or to a folder on a user's own computer can be either stored separately or can be maintained as part of a file allocation table.

Figure 10:
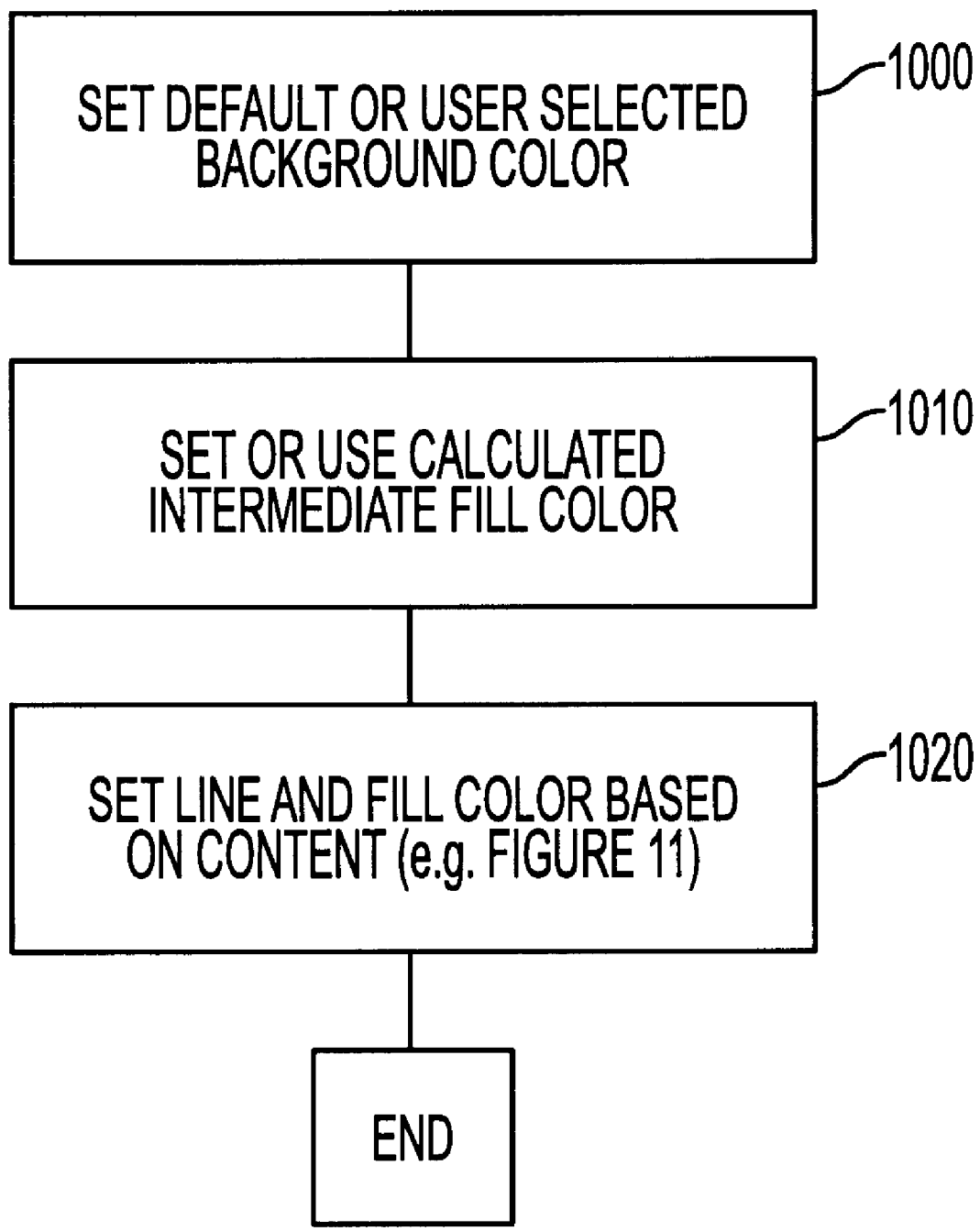
FIG. 10 is a flow chart of a process for establishing colors used in display of icon object.

FIG. 10 is a flow chart of a process for establishing colors used in display of an icon object. A background color is selected using either a default or users selected value (1000). An intermediate background color is either calculated deterministically as indicated above or is selected by the user as a default (1010). The line and fill color are determined based on content as discussed more in conjunction with FIG. 11.

Figure 11:
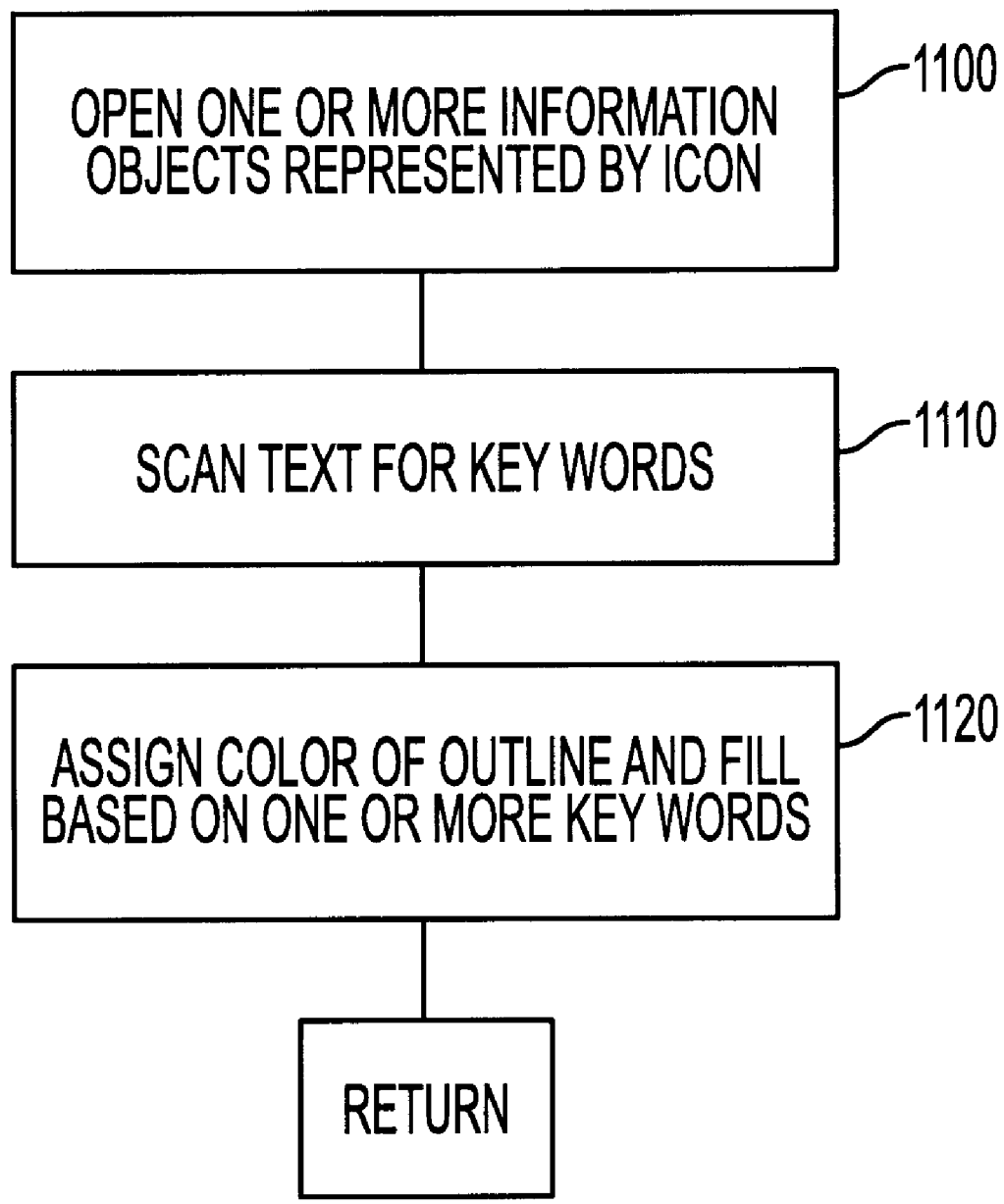
FIG. 11 is a flow chart of a process for assigning line and fill color for icons based on content of underlying information object.

FIG. 11 is a flow chart of a process for assigning line and fill color for an icon, based on content of the underlying information object. One or more information objects represented by an icon are opened (1100) and scanned for various key words and/or phrases (1110). The color assigned to the outline and fill of an icon are based on the presence of one or more key words and/or phrases (1120) and the process returns to the calling process.

FIG. 12 is an exemplary database linking terms of an information object with desired color and degree of blinking useful in the process of FIG. 11. FIG. 12 is essentially a database established by the user for identifying terms of importance and for establishing the color and/or frequency of blink for an icon having these terms or phrases. In this case, the user would like any information object containing the name Jack A. Jones to be labeled red and to be aggressively blinked because Jack A. Jones is the user's boss and presumably the user wishes to keep him happy by responding promptly to any information originating from him or being aware of information relating to him. The user is involved in a number of outside activities including project SETI. In the information objects relating to that project should be colored blue and have no blinking attribute.

Order forms, for the business in which the user works, require prompt attention and should be displayed in yellow with an aggressive blink.

FIG. 13 illustrates how an icon object is stored in an exemplary form of the invention. As shown in FIG. 13, each icon has a name, which is the text displayed underneath the icon, a type of icon, that is an indication whether an icon represents an electronic mail (e-mail) message, a file, a text document, a program or the like. The information object represented is a fully qualified description of the file name within the file management system of the computer in use. The outline is a pointer to a bit map storage of the shape of the icon. The degree of fill, the color of fill, the frequency of blinking and the degree of blinking are values derived in accordance with processes described above in accordance with the invention. The location on the screen specifies the X and Y coordinance where the icon should be displayed in the window in which the icon appears. Associated with the data structure are one or more processes. In this particular case, process 1 is a process which paints the pixels of the icon having the attributes described in the object at the location on the screen of the window when the icon is to be displayed.

Figure 14:
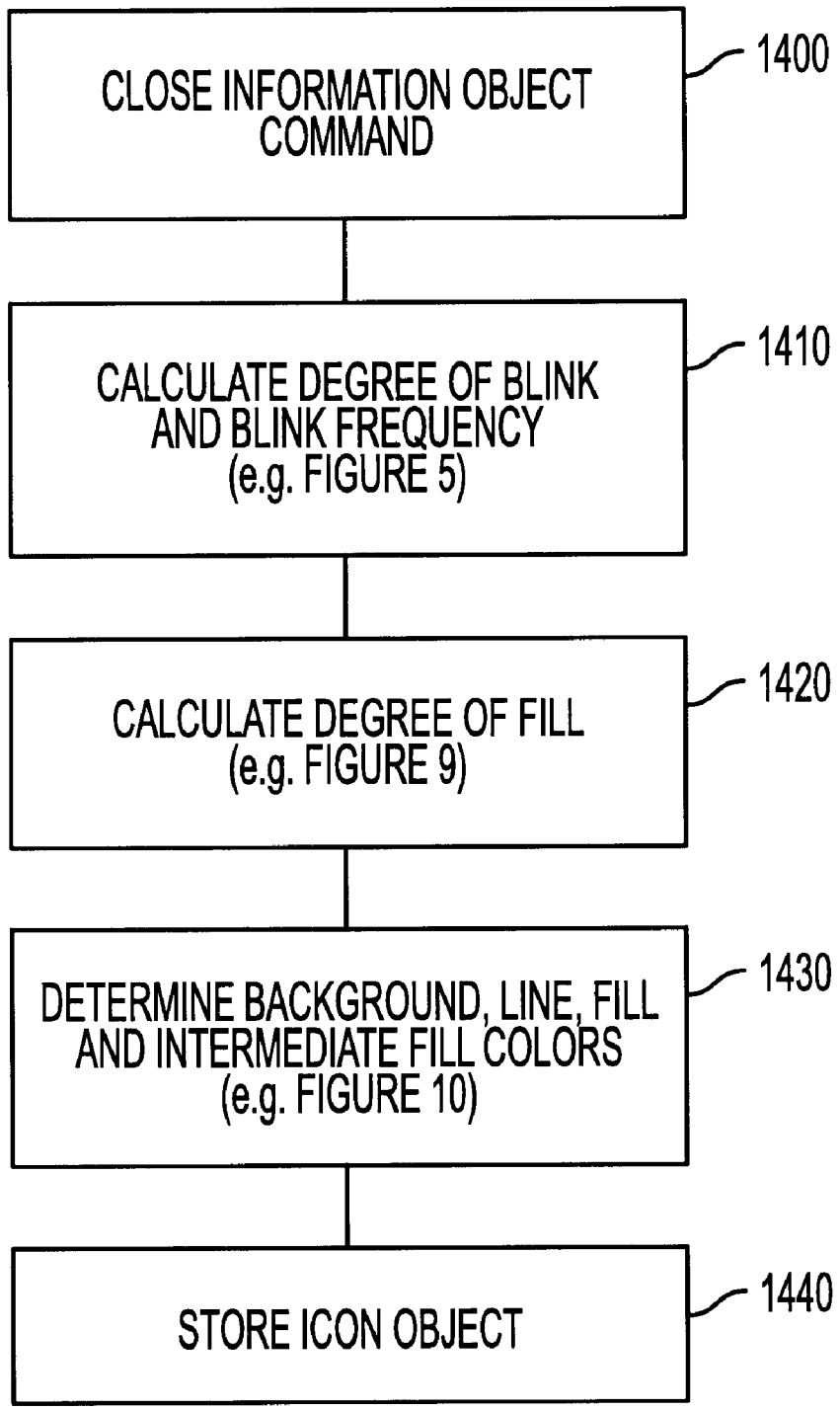
FIG. 14 is a flow chart of a process determining attribute values for an icon based on the underlying information object.

FIG. 14 is a flow chart of a process associating attribute values with a icon based on the underlying information object. When a new information object is created, it is associated with an instance of an icon object suitable for the type of object created. If an old object is being revised, it is already associated with an icon. When a new object is created or when a old object is being revised, at the close of that process, the closing of the information object command (1400) will invoke the steps of the process shown in FIG. 14. A calculation of degree of blink and blink frequency will be undertaken. This may be implemented as shown, for example, in FIG. 5 (1410). The degree of fill of the icon may be determined (1420) as shown in the example shown in FIG. 9 (1420). The background, line, fill and intermediate fill colors are determined as shown for example in FIG. 10 (1430) and all of the information determined or stored in the icon object as the underlying information object disclosed.

Figure 15B:
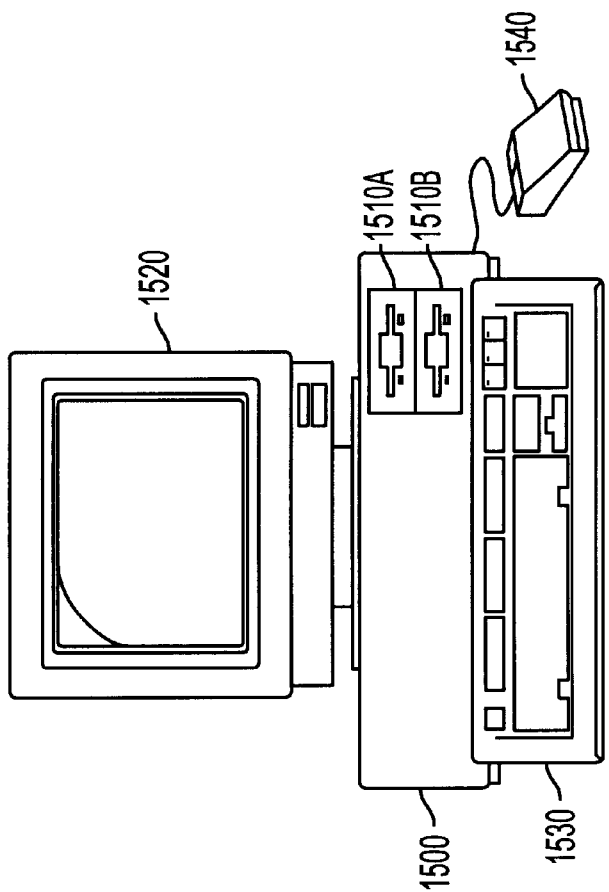
FIG. 15B is a block diagram of an exemplary construction of the computer of FIG. 15A.

FIG. 15B is a view of a computer suitable for use as a network advertising display. Viewed externally in FIG. 15A, a computer system has a central processing unit 1500 having disk drives 1510A and 1510B. Disk drive indications 1510A and 1510B are merely symbolic of a number of disk drives which might be accommodated by the computer system. Typically, these would include a floppy disk drive such as 1510A, a hard disk drive (not shown externally) and a CD Rom drive indicated by slot 1510B. The number and type of drives varies, typically, with different computer configurations. The computer has the display 1520 upon which information is displayed. A keyboard 1530 and a mouse 1540 are typically also available as input devices over interface 1545. Preferably, the computer illustrated in FIG. 15A is a SPARC work station from Sun Microsystems, Inc.

Figure 15A:
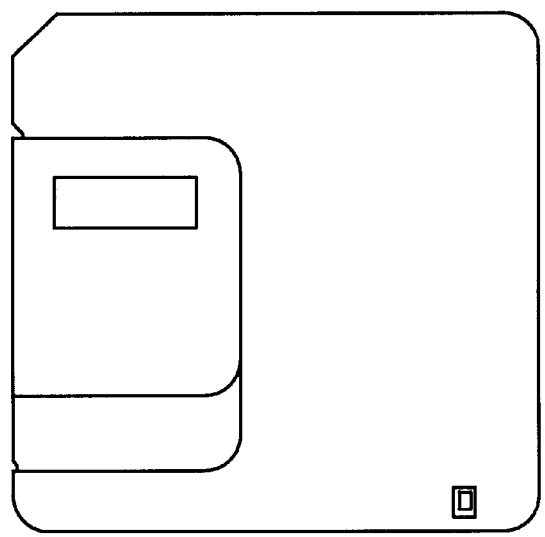
FIG. 15A is a view of a computer suitable for use in implementing the invention.
Figure 15C:
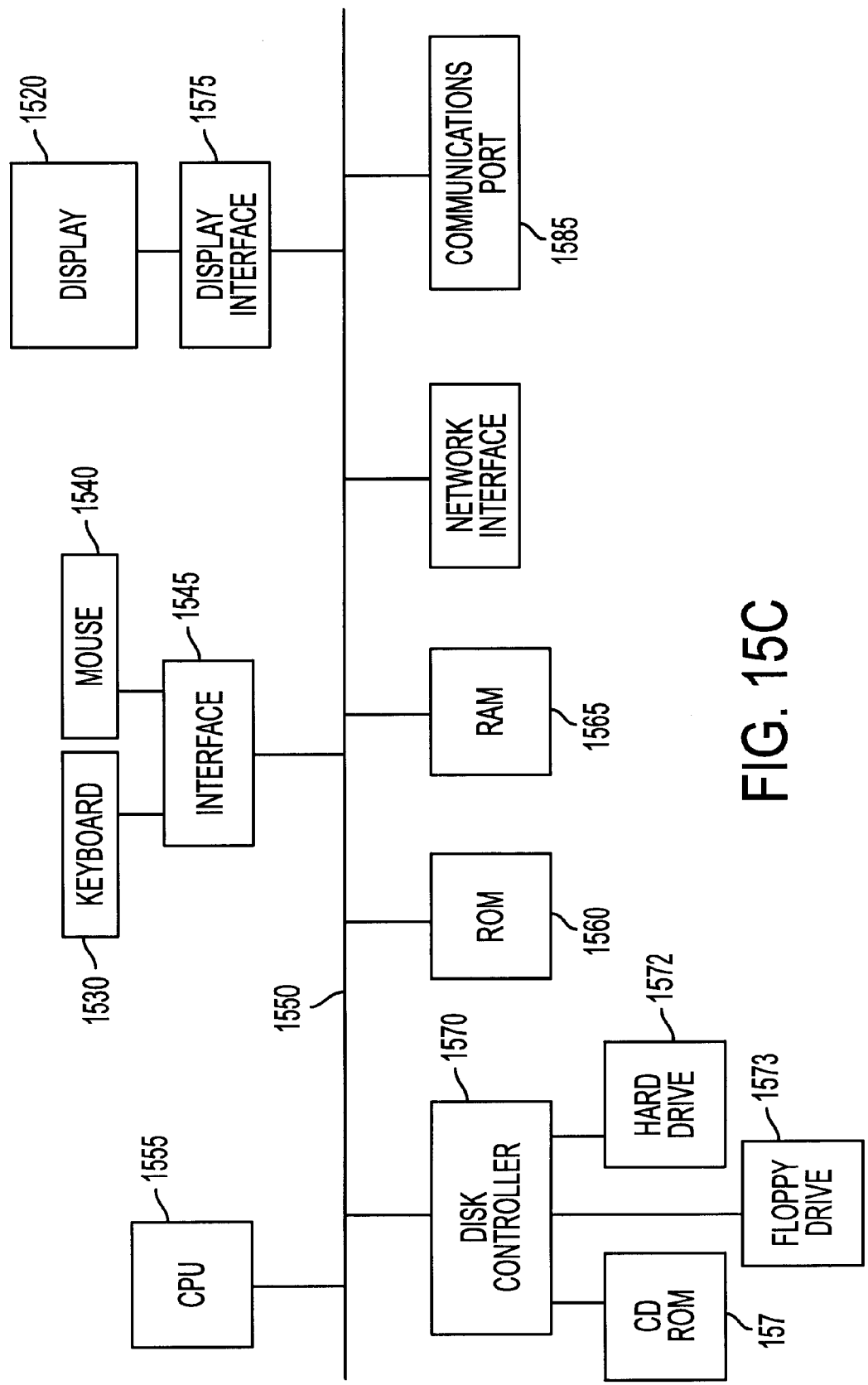
FIG. 15C is an exemplary memory medium of a type suitable for carrying data and programs for carrying out the invention.

FIG. 15C illustrates a block diagram of the internal hardware of the computer of FIG. 15A. A bus 1550 serves as the main information highway interconnecting the other components of the computer. CUP 1555 is the central processing unit of the system, performing calculations and logic operations required to execute a program. Read only memory (1560) and random access memory (1565) constitute the main memory of the computer. Disk controller 1570 interfaces one or more disk drives to the system 1550. These disk drives may be floppy disk drives, such as 1573, internal or external hard drives, such as 1572, or CD ROM or DVD (Digital Video Disks) drives such as 1571. A display control or interface 1575 interfaces display 1520 and permits information from the bus such as that shown in FIG. 6 to be displayed on the display. Communications with external devices can occur over communications port 1585. A network interface permits the computer to communicate over a network with other devices.

FIG. 15A illustrates an exemplary memory medium which can be used with drives. Typically, memory media such as a floppy disk, CD ROM, or a Digital Video Disk will contain inter alia the data and program information for controlling the computer to enable the computer to perform its functions in accordance with the invention.

In this way, icons are customized to reflect the underlying content of the information object they represent. Where large numbers of icons appear on the screen, important icons can be readily identified by the various visual attributes associated with them. Priorities can be established in accordance with the user wishes automatically so that the user is automatically directed to important material represented by the icons.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for displaying information, comprising:

a. a computer b. a display controller configured to control the display of icons so that each displayed icon can simultaneously depict more than one independent information variable corresponding to said each displayed icon, a level of each independent variable being respectively depicted by at least one of frequency of blinking, degree of blinking and degree of fill of the icon; and c. a display connected to said computer by said display controller.

2. Apparatus of claim 1 in which said more than one independent variable comprises four independent variables.

3. Apparatus of claim 2 in which said four independent variables are represented by frequency of blinking, degree of blinking, degree of fill and color of icon, respectively.

4. Apparatus of claim 1 in which said degree of blinking includes a no blink state, a subtle blink state, an intermediate blink state and an aggressive blink state.

5. The apparatus of claim 4 in which said aggressive blink state reduces and restores intensity of internal and external borderlines of said icon and a fill of said icon, said intermediate blink state reduces and restores said fill of said icon, and said subtle blink state reduces and restores said color of said icon.

6. A method for displaying information, comprising a step of:

a. providing an element for performing the step of independently setting two or more visual characteristics of an icon to simultaneously represent two or more different items of information about an information object represented by said icon, said visual characteristics being selected from the group comprising frequency of blinking, degree of blinking, degree of fill and color of the icon.

7. The method of claim 6 in which said information object is a file folder and said information includes a percentage of files having a revision date subsequent to the last time the user viewed the file.

8. The method of claim 7 in which said percentage is represented by degree of fill.

9. The method of claim 6 in which said information object is an e-mail message and said information includes information about an originator of the message.

10. The method of claim 9 in which said information about the originator is represented by at least one of color of icon, degree of blink or frequency of blink.

11. The method of claim 6 in which said information object is an e-mail message and said information includes information about content of the message.

12. The method of claim 11 in which said information about the content is due date.

13. The method of claim 11 in which said information about the content is priority.

14. A method for displaying information, comprising the steps of:

a. providing an element for performing a step of scanning a text of an e-mail message for key words or phrases, and b. providing an element for performing the step of setting visual characteristics of an icon based on said key words or phrases.

15. A computer system, comprising:

a. a network; and b. a plurality of computers connected to said network, least one of said computers configured to control a display of icons so that more than one independent variable can be simultaneously depicted in a visual display of an icon, a level of each independent variable being respectively depicted by at least one of frequency of blinking, degree of blinking and degree of fill of the icon.

16. A computer program product for displaying information, comprising:

a. a memory medium; and b. a computer program stored on said memory medium, said computer program containing instructions for independently setting two or more visual characteristics of an icon to simultaneously represent two or more different items of information about an information object represented by said icon, said visual characteristics being selected from a group comprising frequency of blinking, degree of blinking, and degree of fill of the icon.

17. The computer program product of claim 16 in which said visual characteristics are further selected from the color of the icon.

18. A computer program product for displaying information, comprising:

a. a memory medium; and b. a computer program stored on said memory medium, said computer program containing instructions for scanning text of an e-mail message for key words or phrases, and for setting visual characteristics of an icon based on said key words or phrases.

* * * * *